(12) United States Patent
Roll (10) Patent No.: US 9,997,977 B1
(45) Date of Patent: Jun. 12, 2018

(54) DUAL ENGINE GENERATOR

(71) Applicant: MWE Investments LLC, Columbus, OH (US)

(72) Inventor: Michael John Roll, Columbus, OH (US)

(73) Assignee: MWE Investments LLC, Columbus, OH (US)

(*) Notice: Subject to any disclaimer, the term of this patent is extended or adjusted under 35 U.S.C. 154(b) by 0 days. days.

(21) Appl. No.: 15/438,716

(22) Filed: Feb. 21, 2017

Related U.S. Application Data (60) Provisional application No. 62/298,123, filed on Feb. 22, 2016.

(51) Int. Cl.
*H02K 7/18* (2006.01)

(52) U.S. Cl.
CPC .................... *H02K 7/1815* (2013.01)

(58) Field of Classification Search
CPC ....................................................... H02K 7/1815
See application file for complete search history.

(56) References Cited

U.S. PATENT DOCUMENTS

| | | | |
|---|---|---|---|
| 4,128,769 A * | 12/1978 | Bons | F01D 25/30 181/213 |
| 4,661,761 A | 4/1987 | Katsumata | |
| 5,420,469 A | 5/1995 | Schmidt | |
| 5,493,200 A | 2/1996 | Rozman et al. | |
| 5,552,640 A | 9/1996 | Sutton et al. | |
| 5,594,322 A | 1/1997 | Rozman et al. | |
| 5,899,174 A * | 5/1999 | Anderson | F02B 63/04 123/2 |
| 6,376,944 B1 * | 4/2002 | Grizzle, Jr. | F02B 63/04 123/2 |
| 7,314,397 B2 | 1/2008 | Sodemann et al. | |
| 7,554,214 B2 | 6/2009 | Fattal | |
| 8,267,835 B2 | 9/2012 | Raasch et al. | |
| 8,358,111 B2 | 1/2013 | Rozman et al. | |
| 8,598,722 B2 | 12/2013 | Hofbauer et al. | |
| 8,742,701 B2 | 6/2014 | Sujan et al. | |
| 9,190,848 B2 | 11/2015 | Collie | |

(Continued)

FOREIGN PATENT DOCUMENTS

GB    200502045    3/2005

*Primary Examiner* — Viet Nguyen
(74) *Attorney, Agent, or Firm* — Invention To Patent Services; Alex Hobson (57) ABSTRACT

A dual engine generator has two engines and two inverters and two alternators configured within an inner enclosure. An outer enclosure extends around the inner enclosure to create plenums for airflow. Cooling airflow enters through the outer cover and flows through the plenums and into the inner enclosure to cool the components therein. Airflows out of the inner enclosure and into the plenums and finally exhausts from the outer enclosure. The outer enclosure may have rounded sides to form a pill shaped enclosure. The outer covers are configured to deflect or flex in high wind condition and protect the inner enclosure. The engines are configured above the alternator and inverter and a flow of air reduces heat from the engines from overheating the other components. The mufflers are within the plenums and a flow of exhaust air from within the inner enclosure is directed over the mufflers.

13 Claims, 12 Drawing Sheets

(56) References Cited

U.S. PATENT DOCUMENTS

| | | | |
|---|---|---|---|
| 2003/0042237 A1* | 3/2003 | Brofft | F02B 63/04 |
| | | | 219/133 |
| 2005/0121533 A1* | 6/2005 | Johnson | F24H 3/065 |
| | | | 237/16 |
| 2007/0132243 A1* | 6/2007 | Wurtele | F01N 13/08 |
| | | | 290/1 A |
| 2008/0129053 A1* | 6/2008 | Piercey | F01P 1/06 |
| | | | 290/1 B |
| 2008/0157600 A1 | 7/2008 | Marlenee et al. | |
| 2009/0322096 A1* | 12/2009 | Errera | F01N 5/04 |
| | | | 290/1 A |
| 2013/0106118 A1 | 5/2013 | Koenen et al. | |
| 2014/0084594 A1 | 3/2014 | Marchand | |
| 2014/0156099 A1 | 6/2014 | Ayana et al. | |

* cited by examiner

DUAL ENGINE GENERATOR

CROSS REFERENCE TO RELATED APPLICATIONS

This application claims the benefit of priority to U.S. provisional patent application 62/298,123, entitled Generator and filed on Feb. 22, 2016; the entirety of which is hereby incorporated by reference herein.

BACKGROUND OF THE INVENTION

Field of the Invention

The present invention relates to dual engine generators comprising an inner enclosure and an outer enclosure with a plenum therebetween to provide a plenum for the flow of cooling air.

Background

Generators are used outdoors and are subject to a wide range of weather conditions. Generators are often used during severe weather, as this is the cause of power loss. During these severe storms, the winds can be extreme causing damage to the generators. High winds can carry objects that become projectiles that can impact the generator causing dents, or piercing the outer shell, causing damage to the interior components, such as the engine, fans, inverters, controllers and the like.

Generators having a combustion engine can get very hot and are recommended to be placed a safe distance from structures, such as a home or building. The exterior housing can become very hot and contact, or the close proximity to other objects creates a fire hazard. Combustion engine sometimes catch fire, and the use of combustible fuels makes fire containment a serious challenge.

The close proximity of the electronics and electrical components of a generator including a controller, inverter and the like, to the engine can be detrimental to these components. Heat emitted from the engine can damage these components.

One of the biggest complaints of generators is the noise level. The engine is contained within a metal housing which provides very little sound suppression.

SUMMARY OF THE INVENTION

The invention is directed to a dual engine generator having an inner enclosure and an outer enclosure with a plenum therebetween to provide a plenum for the flow of cooling air. The inner enclosure is a structural support for the components of the generator and may be made from steel panels that are joined to provide a rigid structure. The inner enclosure is preferably very strong structurally and can withstand high wind loads found on the coastal areas of the east and south east US. Often times municipalities require a permit to install a generator in these high wind areas and will only allow generators that have a high resistance to wind loading. This unique design easily resists high wind loads without added anchors or strengthening plates as seen with other design. The outer enclosure provides a sacrificial outer barrier and may be configured to flex and deflect under high wind loads. The gap, or space between the outer enclosure and the inner enclosure make it less likely that objects that penetrate the outer enclosure will damage any of the components within the inner enclosure. The inner assembly contains the engines and all hot components that make up a generator.

The inner enclosure effectively creates a fire box that will contain or minimize the spread of fire that is always associated with combustible fuels and engines. The outer enclosure and plenum, between the inner and outer enclosures, further reduces the risk of a fire within the inner enclosure causing damage to nearby objects and reduces the potential for flames to be emitted from the generator. Due to this unique architecture, the generator can be placed closer to a house or other structure than most single enclosure generators, without the risk or fire spreading onto the dwelling.

The architecture of the inner and outer enclosure also increases the sound reduction, wherein the plenum between the inner and outer enclosures absorbs much of the noise created by the engines and fans within the inner enclosure.

In an exemplary embodiment, the engines and in some cases the alternators are configured in an upper portion of the inner enclosure, thereby making them more accessible for service. In an exemplary embodiment, the top cover is hinged to allow easy access to the top wall and the engines thereunder. In addition, the engines are a main source of heat generation and configuring them in the upper portion of the inner enclosure reduces the heat that the other components, such as the inverter and controller, are exposed to. In an exemplary embodiment, a heat shield is configured between the engines and the other electrical components to further reduce heat exposure. Electronics and electrical component durability are a direct function of how much heat they are exposed to.

An exemplary dual engine generator comprises an inner enclosure comprising a front wall, back, wall, left side wall, right side wall and top wall. These walls may be planar metal panels that may be attached to form a rigid structure and inner volume for retaining the components of the dual engine generator. In an exemplary embodiment, the two engines, the two inverters and the two alternators are all configured within the inner enclosure. The inner enclosure may be attached to a base to further provide support and rigidity. The top wall may be configured to be detached to allow easy access to the components within the enclosure. As described herein, the inner enclosure may be configured with a heat shield between the engines and the inverters and other components within the enclosure.

An exemplary dual engine generator comprises an outer enclosure comprising a left cover, right cover, front cover, back cover and top cover. These covers may be formed from metal panels or sheets. A plenum may be formed between each of these outer enclosure components and the inner enclosure components. This plenum may be used for the flow of cooling and/or exhaust air. Any of the outer enclosure panels or components including the left cover, right cover, front cover, back cover and top cover may have air inlet and outlet apertures or openings to allow air to flow in and out of the generator enclosures. One or more fans may be configured to draw in air or push air out of the generator enclosures. The lid, or top cover, may be hinged to allow easy access to the top wall, which may be configured for detachment, and the components within the inner enclosure. The left and/or right covers may be curved in shape to provide less wind resistance and to allow flexing or deflection without permanent damage. The overall shape of the outer enclosure may be pill shaped, with the sides being planar and the ends having a rounded shape, or having a radius that is about one half the width of the outer enclosure. The plenum between the inner and outer enclosures may reduce the risk of damage to the inner enclosure and the components within the inner enclosure. The outer enclosure may reduce the velocity of projectiles that impact the outer enclosure and cause deflection of the outer enclosure. In the event that a projectile penetrates through the outer enclosure, the air gap between the inner and outer enclosure may prevent the projectile from damaging the inner enclosure or reduce the severity of any deflection or piercing of the inner enclosure.

The plenum between the inner and outer enclosures may be used for inlet airflow and/or exhaust airflow. In an exemplary embodiment, inlet air enters through the front and back covers and flows through the plenum and into the inner enclosure to cool the components therein. The air may then exit through one of or both of the side covers, the left and/or right covers. In an exemplary embodiment, the engines are configured above the other components of the generator and are proximal the top of the inner enclosure. Engine cooling airflow may enter into the front and back plenums and flow up along a top plenum and then down over the engines, through apertures or openings in the top wall. The engine cooling air may then exit through the side covers, left and/or right covers. The plenums between the inner enclosure walls and the outer enclosure covers may be sufficiently large to provide enough airflow without too much pressure drop and may have a plenum gap distance, distance between the inner enclosure and outer enclosure of about 2.5 cm or more, about 5 cm or more, about 8 cm or more, about 10 cm or more, about 15 cm or more and any range between and including the plenum gap distances listed.

In an exemplary embodiment, inverter cooling air enters into the outer enclosure through the front or back cover and then flows through an inverter inlet in the inner enclosure and then over the inverter or inverter fins. After flowing over the inverter, the inverter cooling air may be directed into an inverter plenum that directs the inverter cooling air to the sides of the generators, wherein the air exits through the left or right plenums and covers. In an exemplary embodiment, the orientation of a first generator system and a second generator system is symmetric within the inner enclosure, wherein the first engine, first alternator and first inverter are configured on one side of the inner enclosure and the second engine, second alternator and second inverter are configured on the opposing side of the inner enclosure. The first generator system and a second generator system may be oriented in a mirror fashion with the first inverter receiving inverter cooling airflow from the back cover and back plenum and the second inverter receiving inverter cooling airflow from the font cover and front plenum.

In an exemplary embodiment, an alternator cooling airflows may enter through the front or back covers, flow through the front and back plenums, respectively, and then and flow over the alternators and into an alternator plenum that directs the airflow to the sides of the generator enclosure. The airflow may exit through the left and right covers.

In an exemplary embodiment, a flow of cooling air flow between the engines and the alternators and the inverters to prevent heat from the engines overheating these components. For example, a first engine may be configured above the first alternator and a flow of first alternator cooling air may flow between the alternator and the engine. Likewise, a flow of inverter cooling air may flow between the engine and the inverter.

In an exemplary embodiment, a muffler is configured in the flow of cooling air from the alternator, inverter and/or the engine, and the flow of cooling air acts to cool the muffler.

In an exemplary embodiment, a muffler is configured within the side plenum space, left and/or right, and engine cooling airflow flows over muffler after flowing over the engine. Alternator and inverter cooling airflow may also flow over the muffler on the way to exhaust from the generator. The muffler may be configured in a muffler plenum that shields the muffler from the other components and/or the walls and covers and may direct the airflow around the muffler.

The two engines of the dual engine generator may be configured to work in tandem, to provide a higher power supply than either the first or second engines alone. In addition, the rate of revolution of the engines may be configured to operate based on the power demand required, thereby improving the overall efficiency of the system.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
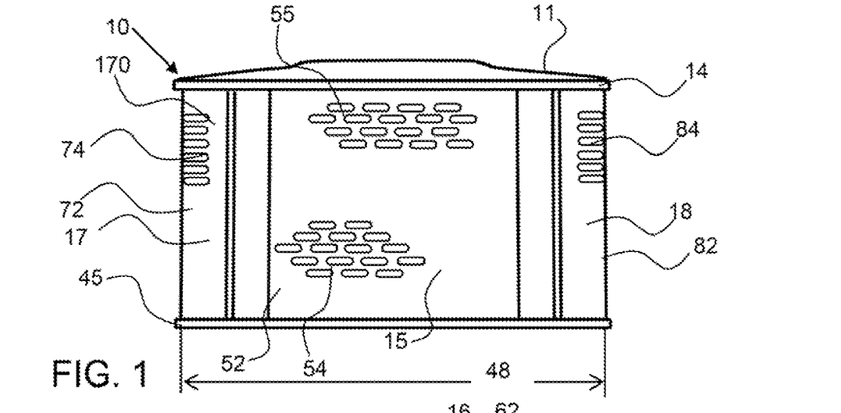
FIG. 1 shows a front view of an exemplary dual engine generator of the present invention.
Figure 2:
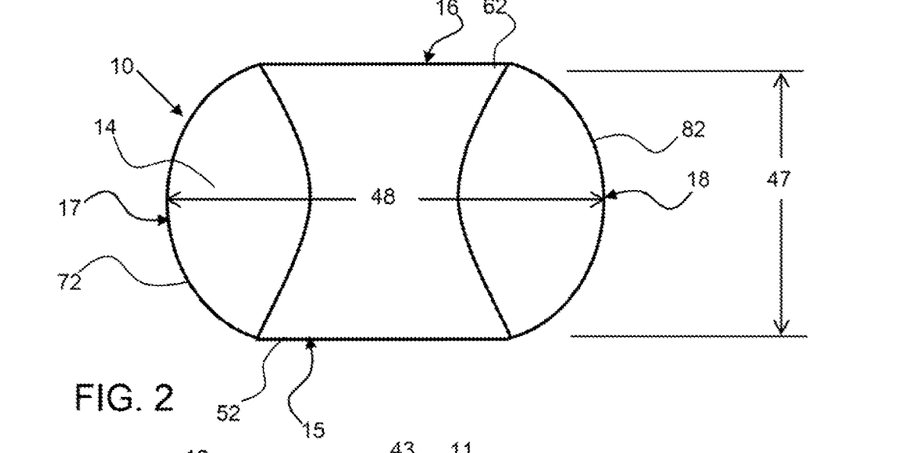
FIG. 2 shows a top view of an exemplary dual engine generator.
Figure 3:
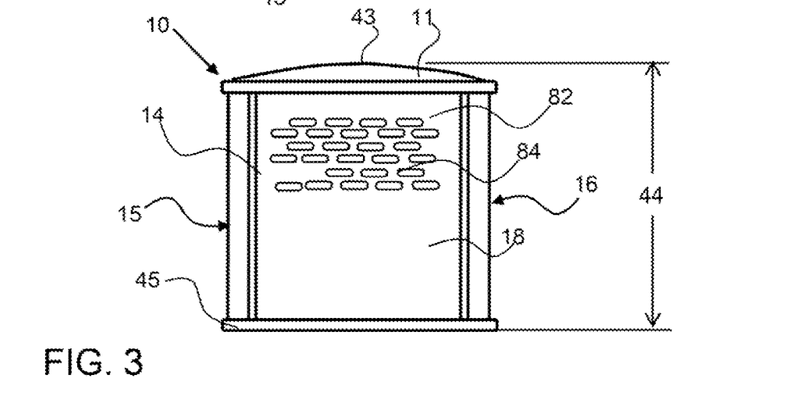
FIG. 3 shows a right side view of an exemplary dual engine generator.

Referring to FIGS. 1 to 3, an exemplary dual engine generator 10 comprises an outer enclosure 170 having a front cover 52 on the front 15, a left cover 72 on the left side 17, a right cover 82 on the right side 18, a back cover 62 on the back side 16 and a top cover 11 on the top 43. The front cover 72 has a plurality of airflow openings 54. The left and right covers have air outlet openings 74 and 84, respectively. The enclosure has a base 45. The dual engine generator 10 has a length 48, a width 47 and a height 44. The length 48 is from the outer extended end of the left cover 72 to the outer extended end of the right cover 82. The height 44 is from the bottom of the base 45 to the top 43. The width 47 is from the outer surface of the front cover 52, to the outer surface of the back cover 62.

Figure 4:
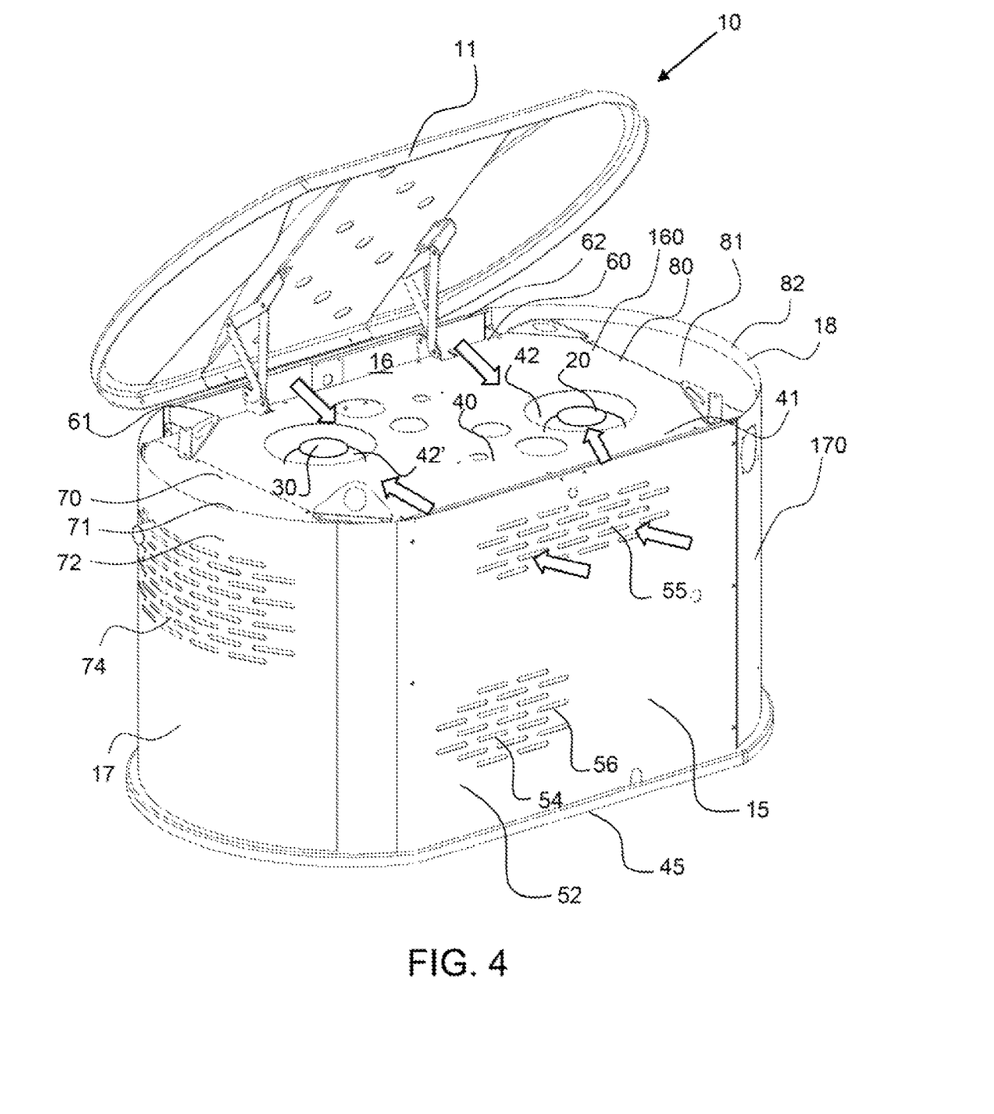
FIG. 4 show a perspective view of an exemplary dual engine generator having the top cover open.

As shown in FIG. 4, an exemplary dual engine generator 10 has the top cover open 11 open to reveal the top wall 40 having airflow openings 42, 42', which are configured to provide airflow to the first engine 20 and second engine 30, respectively. Engine cooling airflow enters through the front cover engine inlet 55, in the front cover 52, and into the front plenum between the front cover and front wall and then up and into the top plenum 41, between the top wall and the top cover 11, and then down through the top wall airflow openings 42, 42' and over the engines. Engine cooling airflow also enters through the back cover 62 through a back cover engine inlet (not shown), and into the back plenum 61 between the back cover and back wall 60 and then up over the top wall 40, along the top plenum 41 and into the airflow openings 42, 42' and over the engines. A right plenum 81 is configured between the right cover 82 and the right wall 80. A left plenum 71 is configured between the left cover 72 and the left wall 70. The left cover has a left cover air outlet 74. The right cover also has a right cover air outlet, not shown.

Figure 5:
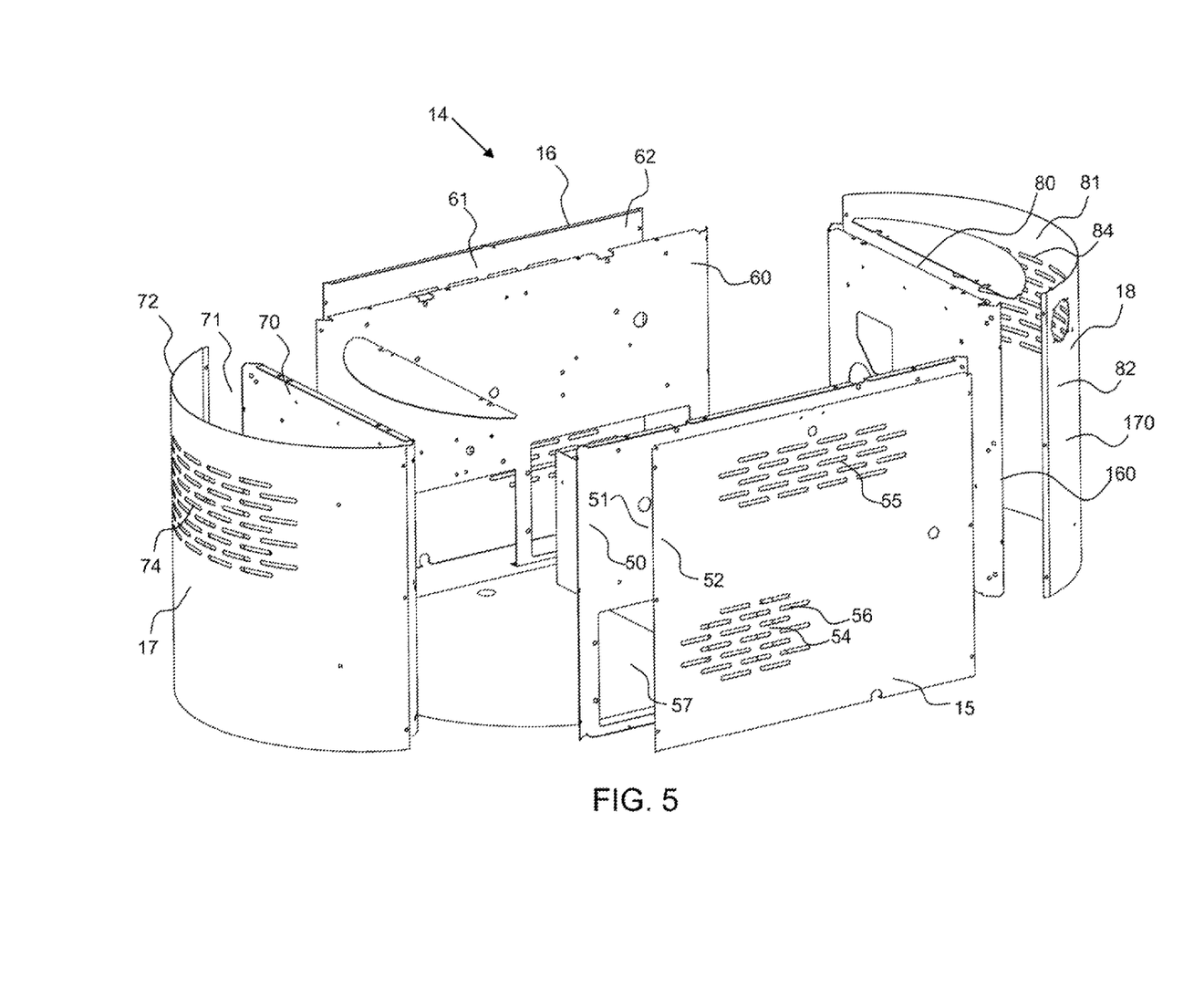
FIG. 5 shows an exploded perspective view of some of the enclosure components of an exemplary dual engine generator.

As shown in FIG. 5, the housing 14 for the dual engine generator has plenums on the left 17, right 18, front 15 and back sides 16 between the inner enclosure 160 and the outer enclosure 170. As described herein, these plenums between the covers and the interior walls provide some deflection during high wind conditions and protect the inner enclosure, or inner walls from deformation and damage from obstacles impacting the outer covers. A front plenum 51 is between the front cover 52 and the front wall 50. A back plenum 61 is between the back cover 62 and the back wall 60. A left side plenum 71 is between the left cover 72 and left wall 70. A right side plenum 81 is between the right cover 82 and right wall 80.

Figure 6:
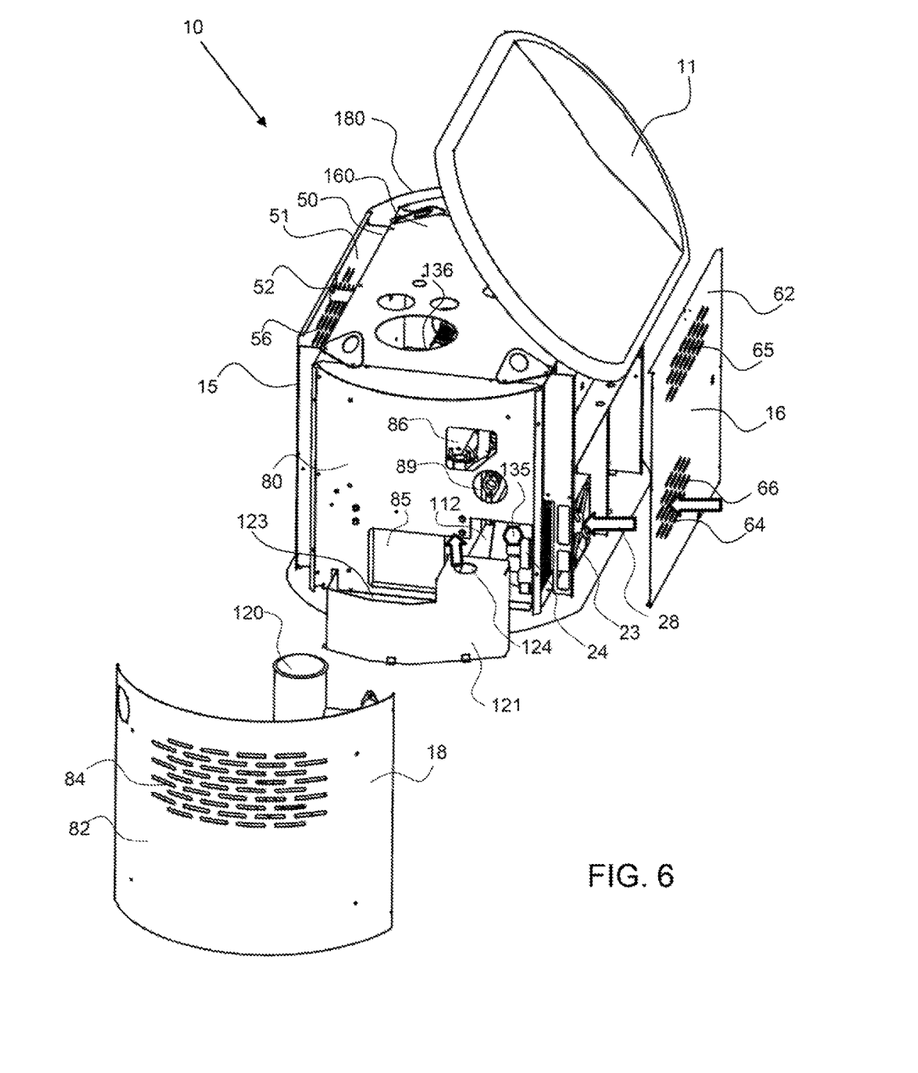
FIG. 6 shows a right-side perspective view of an exemplary dual engine generator having the right cover and back cover detached.

As shown in FIG. 6, inverter airflow 28, produced by the inverter fan 23, enters a back cover air inlet 66, and specifically into the inverter inlet 66 in the back cover 62 and then flows through the first inverter fan 23, across the first inverter 24, into the first inverter plenum 112, out of the muffler inverter outlet 124 and finally out of the right cover air outlet 84. The inverter fan 23 may be activated by a controller 136 when an inverter temperature sensor 135 detects that the inverter is above a threshold temperature. The inverter fan may be deactivated during initial start-up of the generator to reduce power draw. A right wall air outlet 85, or opening in the right wall 80 for the flow of air allows airflow from the inverter plenum to flow into the muffler plenum 121. The muffler 120 is configured partially within the muffler plenum 121 and is cooled, in part, by airflow from the inverter fan. The right wall 80 has a number of other openings, an access opening 86 and a muffler opening 89. The front plenum 51 is shown in this figure. The back cover engine inlet 65 is shown in the back cover 62. The configuration of the first inverter, first inverter fan, first inverter temperature sensor and the like is mirrored on the opposing end of the housing for a second inverter system.

Figure 7:
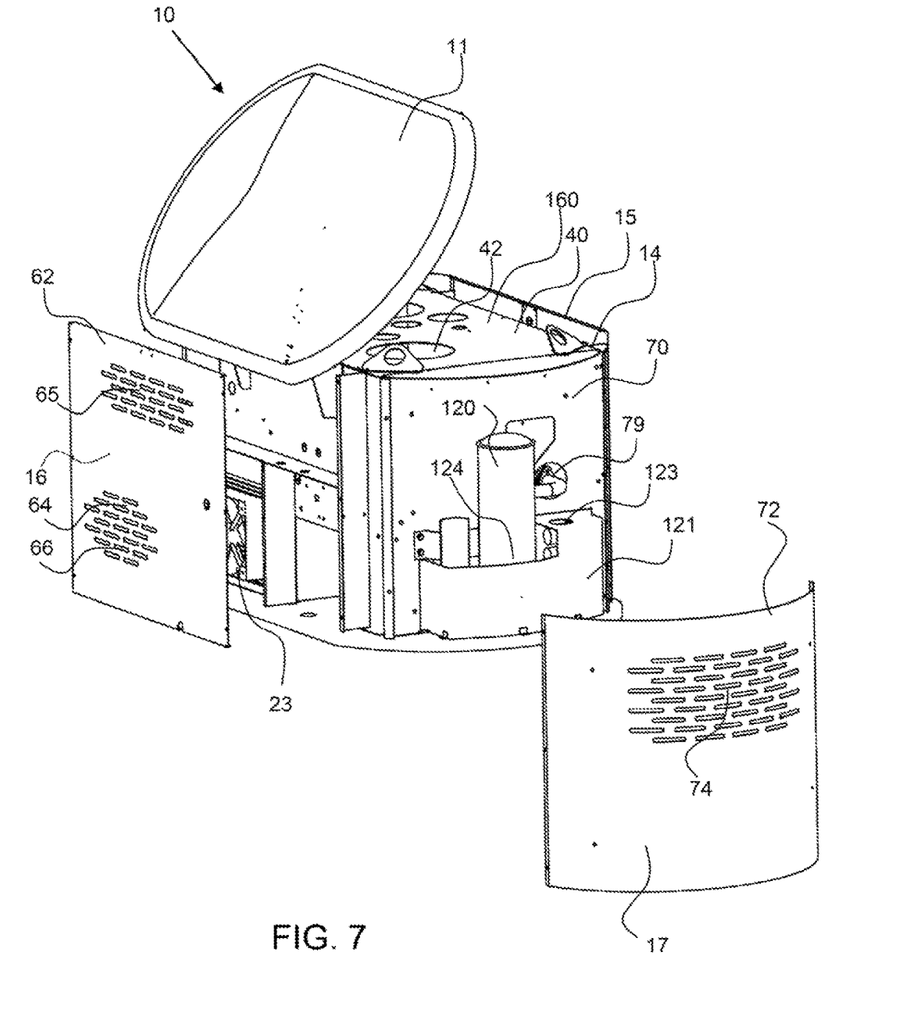
FIG. 7 shows left-side perspective view of an exemplary dual engine generator having the left cover and back cover detached.

As shown in FIG. 7, the same configuration of inverter, muffler and muffler plenum are configured on the left side 17 of the housing 14. The first inverter fan 23 is shown on the back side 16 of the housing 14. The left cover 72 has a left cover air outlet 74 for outlet flow of cooling air from within the inner enclosure 160.

Figure 8:
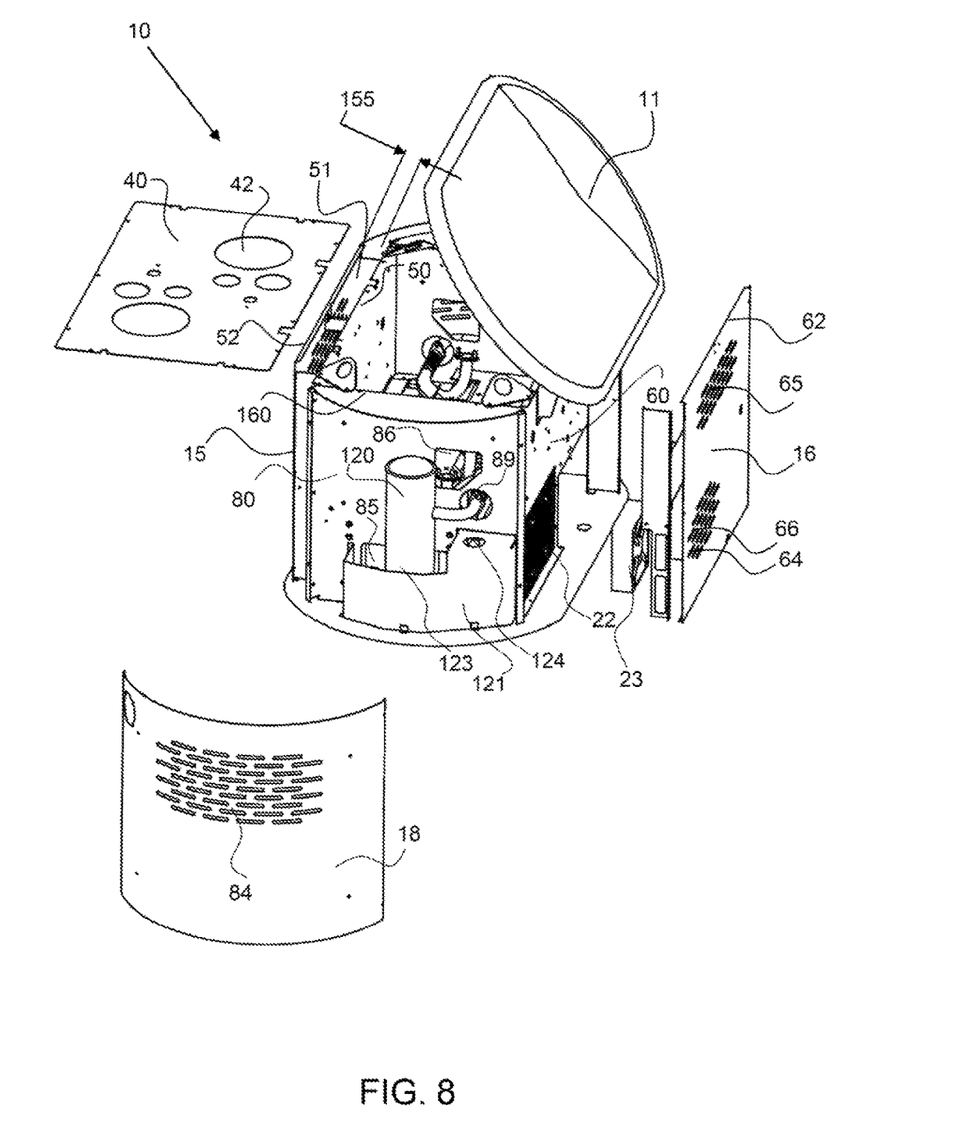
FIG. 8 shows a right-side perspective view of a portion of an exemplary dual engine generator having the right cover, top wall and back cover detached.

As shown in FIG. 8, the top wall 42 is detached to show the interior volume of the interior enclosure 160 for retaining the engines, not shown. The muffler 120 is shown partially within the muffler plenum 121 and receiving engine exhaust gas from a conduit that extends through the muffler opening 89 in the right wall 80. The front plenum gap distance 155, or distance from the outer surface of the font wall 50 to the inner surface of the front cover 52, is shown. This plenum gap distance may be the same on the front plenum and on the back plenum.

Figure 9:
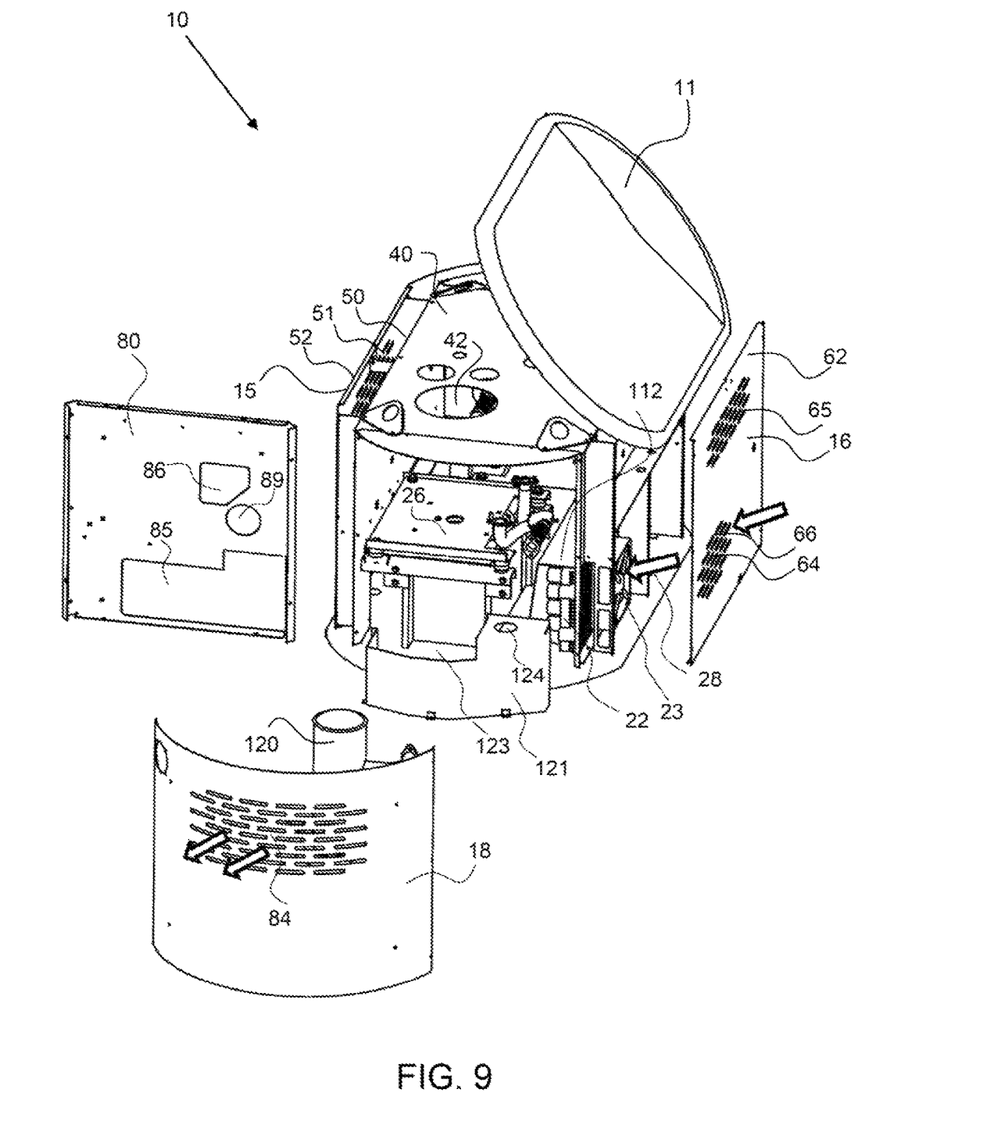
FIG. 9 shows a right-side perspective view of a portion of an exemplary dual engine generator having the right cover, right wall and back cover detached.

As shown in FIG. 9, the right wall 80 is detached to show the various openings therein. The right wall 80 has an access opening 86, a muffler opening 89 and a right wall air outlet 85. The first inverter 22 is shown being along the inverter plenum 112. The first engine mounting plate 26 is shown and is above the alternator, not shown. The mounting plate may be a heat shield.

Figure 10:
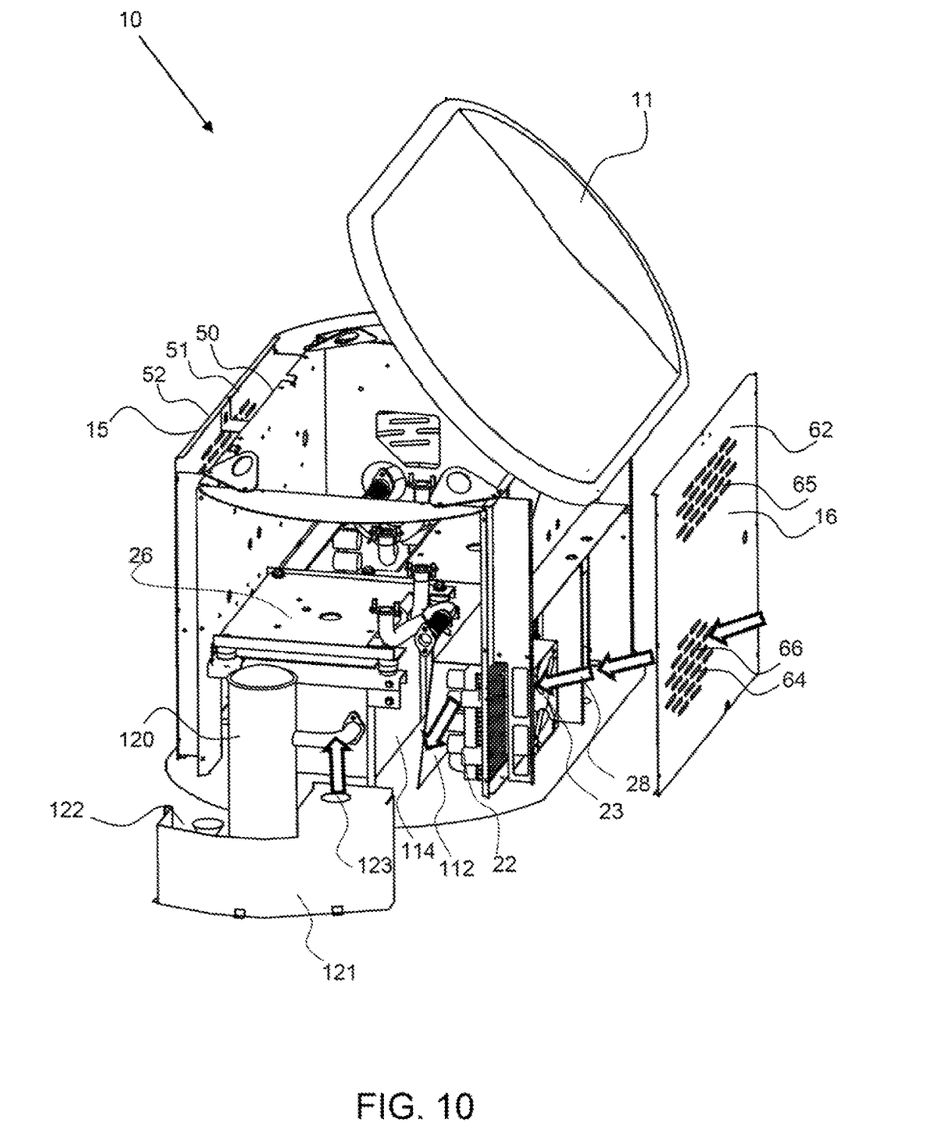
FIG. 10 shows a right-side perspective view of a portion of an exemplary dual engine generator having the muffler plenum and back cover detached.

As shown in FIG. 10, the muffler 120 and muffler plenum 121 are pulled away to more clearly show the inverter plenum 112 and the alternator plenum 114. The first inverter airflow 28 flows through the first inverter fan 23, across the inverter or inverter fins and then into the inverter plenum 112.

Figure 11:
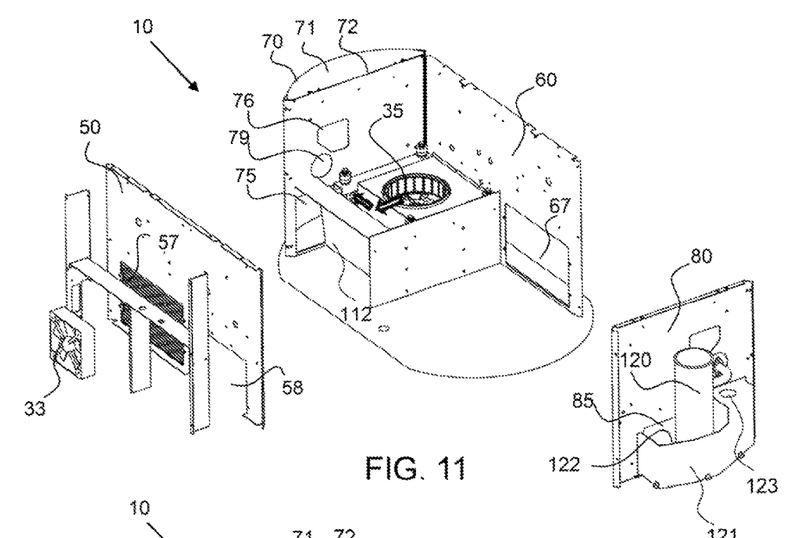
FIGS. 11 and 12 show a perspective view of a portion of an exemplary dual engine generator having the front wall, right wall and right muffler plenum and muffler detached.
Figure 12:
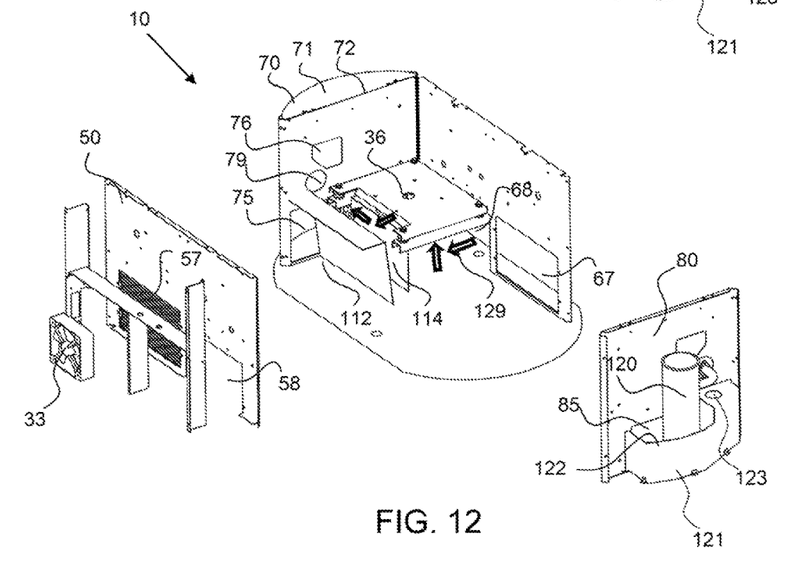
Figure 13:
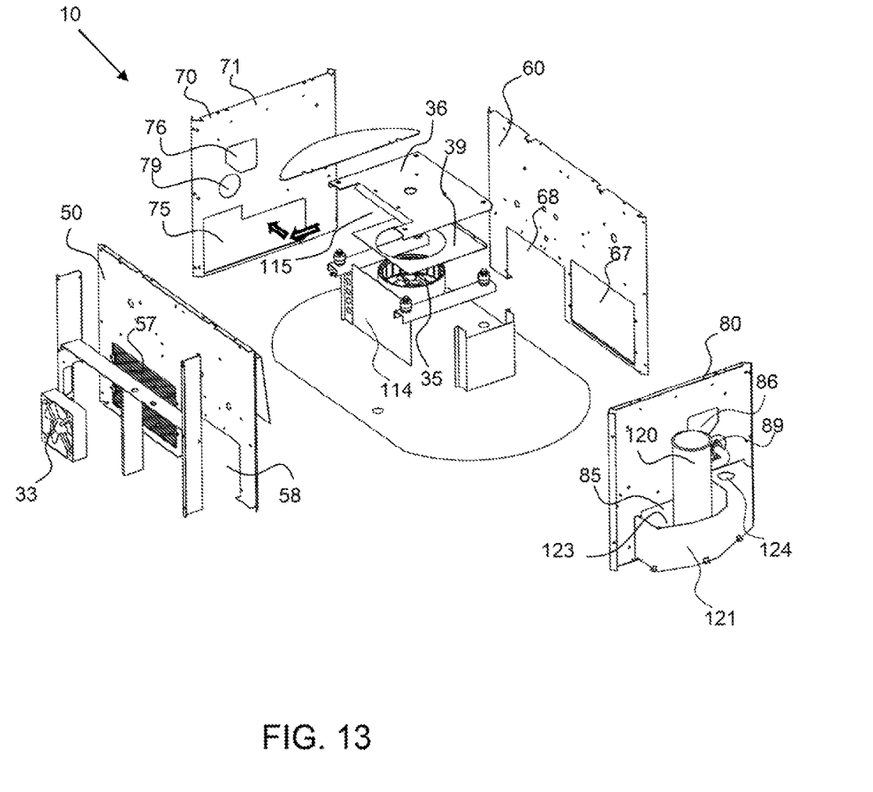
FIG. 13 shows an exploded perspective view of portions of an exemplary dual engine generator.

Referring to FIGS. 11, 12 and 13, a second alternator fan 35 is configured under the second engine mounting plate 36 and draws alternator cooling airflow 129 from the back wall through the back wall alternator opening 68, as indicated by the bold arrows. The alternator cooling airflow then passes through a plenum between the second engine mounting plate 36 and the alternator, and down into the alternator plenum 114. As shown in FIG. 12, the alternator plenum 114 and inverter plenum 112 are separated by a plate and the two separate cooling airflows are directed into the left side plenum 71. As shown in FIG. 13, the mounting plate plenum 115 is between the mounting plate 36 and alternator plate 38. Again, note that the construction is symmetric, with this same configuration on the right side for a first alternator, first alternator fan, first alternator plenum and the like.

Figure 14:
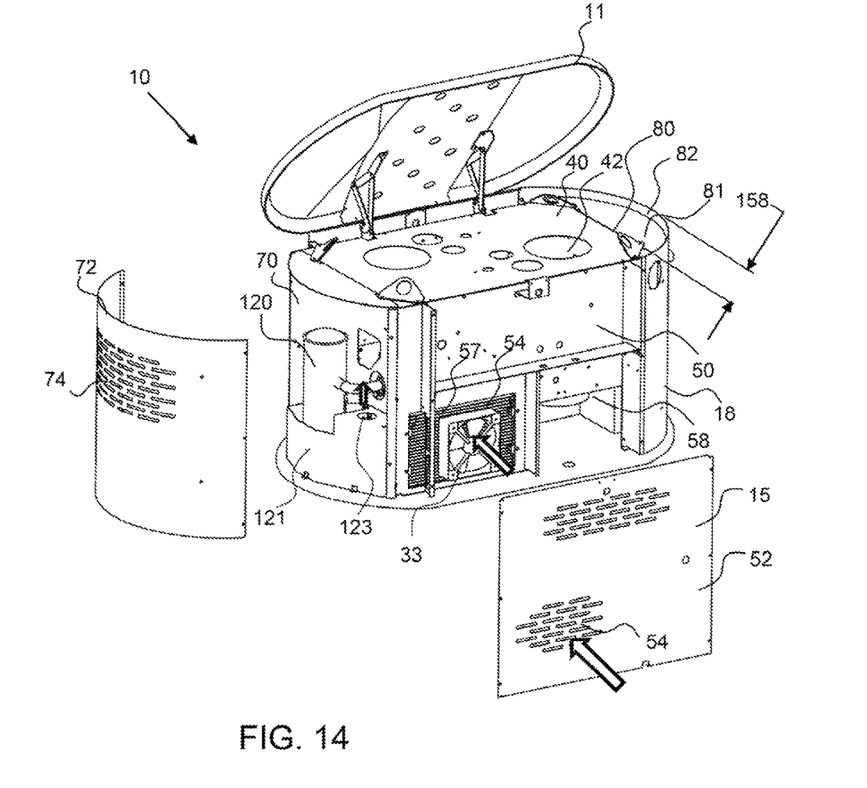
FIG. 14 shows a perspective view of an exemplary dual engine generator with the left cover and front cover removed.

As shown in FIG. 14, the front wall 50 has a front wall inverter inlet 57 and a front wall alternator inlet 58 that receive flow from the front plenum. The right side plenum gap distance 158, or distance from the outer surface of the right wall 80 to the most extended inner surface of the right cover 82, is shown. The left side may be configured with the same plenum gap distance.

Figure 15:
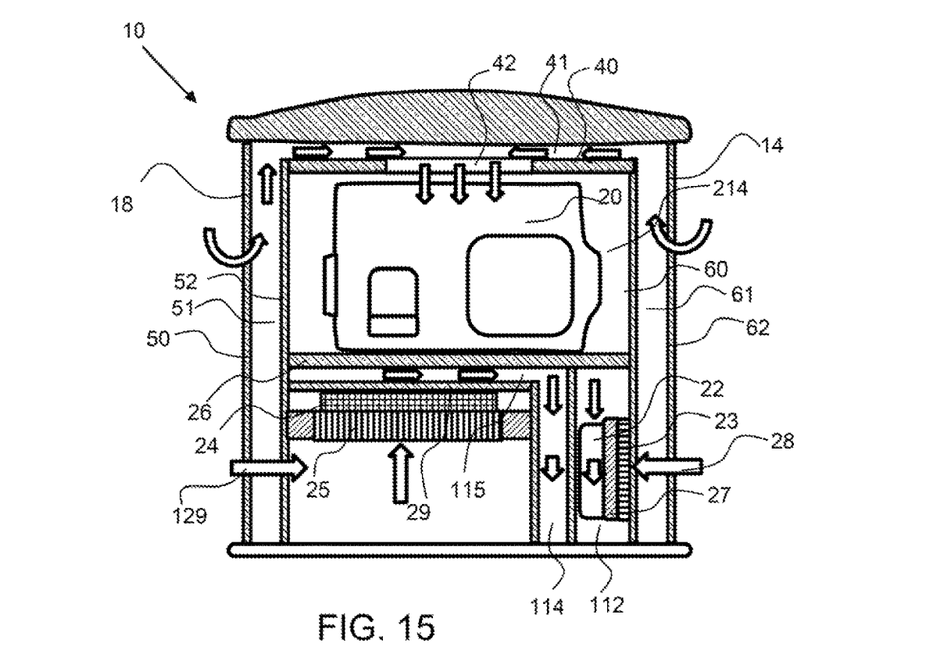
FIGS. 15 and 16 show cross sectional views of an exemplary dual engine generator having two engines, two alternators, two inverters, two inverter fans, two alternator fans and a configuration of plenums to effectively and efficiently circulate air to cool components.
Figure 16:
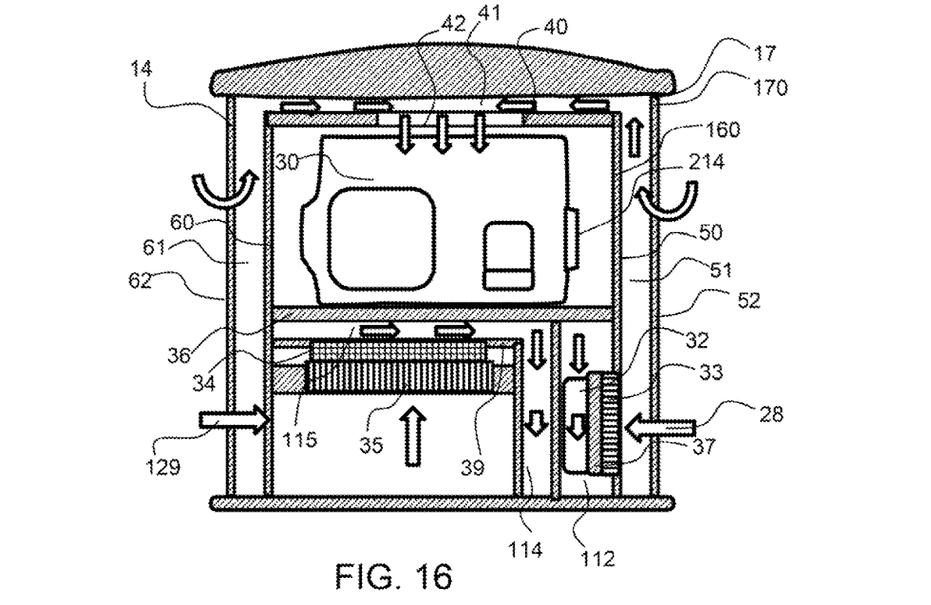

FIGS. 15 and 16 show cross sectional views of an exemplary dual engine generator 10 having two engines 20, 30, two alternators 24, 24, two inverters 22, 32, two inverter fans 23, 33, two alternator fans 25, 35 and a configuration of plenums to effectively and efficiently circulate air to cool components. FIG. 15 shows a right side cross-sectional view that shows the first engine 20, the first inverter 22, first inverter fins 27, the first inverter fan 23, the first alternator 24, the first alternator fan 25, the first engine mounting plate 26, the first alternator plate 29 and the alternator plenum 115. FIG. 16 shows a left side cross-sectional view that shows the second engine 30, the second inverter 32, second inverter fins 37, the second inverter fan 33, the second alternator 34, the second alternator fan 35, the second engine mounting plate 36, the second alternator plate 39 and the alternator plenum 115. As shown in FIG. 15, inverter cooling air 28 enters through the back cover 62, and then through the back wall 60, where it passes over the first inverter 22 and/or inverter fins 27. The first inverter fan 23 draws the air in from outside of the outer enclosure 170, through the inner enclosure 160 and into the interior volume 214 where it is diverted by the inverter plenum 112 to the right side plenum. The left side has a similar architecture wherein, as shown in FIG. 15, inverter cooling air 28 enters through the front cover 52, and then through the front wall 50, where it passes over the second inverter 32 and/or inverter fins 37. The second inverter fan 33 draws the air in from outer enclosure 170, through the inner enclosure 160 and into the interior volume 214 where it is diverted by the inverter plenum 112 to the left side plenum. As shown in FIG. 15, the first alternator 24 is cooled by cooling air entering the front cover 52 into the front plenum 51, through the front wall 50 and over the first alternator 24. The alternator cooling airflow 129 flows through an alternator plate plenum 115 configured between the first engine mounting plate 26 and the first alternator plate 29. The alternator cooling air then flows into the alternator plenum 114 and into the muffler plenum configured within the right side plenum. As shown in FIG. 16, the second alternator 34 is cooled by cooling air entering the back cover 62 into the back plenum 61, through the back wall 60 and over the second alternator 34. The alternator cooling air flows through an alternator plate plenum 115 configured between the second engine mounting plate 36 and the second alternator plate 39. The alternator cooling air then flows into the alternator plenum 114 and into the muffler plenum configured within the left side plenum.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A dual engine generator comprising:
 a) an inner enclosure comprising:
  i) a front wall;
  ii) a back wall;
  iii) left side wall;
  iv) a right side wall;
  v) a top wall; and
  vi) a base
 b) an outer enclosure comprising:
  i) a front cover;
  ii) a back cover;
  iii) left side cover;
  iv) a right side cover; and
  v) a top cover;
 c) a plenum between the outer enclosure and the inner enclosure comprising:
  i) a left plenum,
  ii) a right plenum;
  iii) a front plenum; and
  iv) a back plenum;
 d) first engine;
 e) a first inverter;
 wherein a flow of first inverter cooling air enters the inner enclosure through a first inverter inlet to cool the first inverter;
 f) a first alternator;
 wherein the first engine is coupled with the first alternator to produce a first electrical power; and
 wherein a flow of first alternator cooling air enters the inner enclosure through a first alternator inlet to cool the first alternator;
 g) a second engine;
 h) a second inverter;
 wherein a flow of second inverter cooling air enters the inner enclosure through a second inverter inlet to cool the second inverter;
 i) a second alternator
 wherein the second engine is coupled with the second alternator to produce a second electrical power; and
 wherein a flow of second alternator cooling air enters the inner enclosure through a second alternator inlet to cool the second alternator;
 j) a controller;
 wherein the first and second electrical powers are combined to produce a dual power for powering a load;
 k) a first inverter fan; and
 l) a second inverter fan,
 wherein the first inverter fan draws said flow of first inverter cooling air to cool the first inverter, and wherein the second inverter fan draws said flow of second inverter cooling air to cool the second inverter,
 wherein the flow of first inverter cooling air passes from the first inverter inlet into a first inverter plenum, that separates the first inverter from the first engine, and from the first inverter plenum through a right wall air outlet in the right side wall and into the right plenum, and wherein the flow of second inverter cooling air passes from the second inverter inlet into a second inverter plenum, that separates the second inverter from the second engine, and from the second inverter plenum through a left wall air outlet in the left side wall and into a left plenum.

2. The dual engine generator of claim 1, wherein the first and second engines, the first and second inverters, and first and second alternators are configured within the inner enclosure.

3. The dual engine generator of claim 2, wherein the first engine is configured above the first inverter and the first alternator and wherein the second engine is configured above the second inverter and the second alternator.

4. The dual engine generator of claim 3, wherein the first engine is separated within the inner enclosure from the first inverter and the first alternator by a first engine mounting plate, and wherein the second engine is separated within the inner enclosure from the second inverter and the second alternator by a second engine mounting plate.

5. The dual engine generator of claim 1, further comprising a top plenum between the top wall and the top cover.

6. The dual engine generator of claim 1, wherein the left and right covers are rounded in shape and wherein the outer enclosure is pill shaped with parallel front and back sides and rounded left and right sides.

7. The dual engine generator of claim 1, further comprising a first muffler and a second muffler coupled to the first and second engines, respectively and wherein the first and second mufflers are configured in the right and left plenums, respectively.

8. The dual engine generator of claim 1, further comprising a first and a second inverter temperature sensor, wherein the first inverter fan is activated by the controller when a first inverter temperature sensor detects a first inverter temperature above a first inverter threshold temperature and wherein the second inverter fan is activated by said controller when a second inverter temperature sensor detects a second inverter temperature above a second inverter threshold temperature.

9. The dual engine generator of claim 1, wherein the flow of first inverter cooling air passes from the right plenum out of a right cover outlet and wherein the flow of second inverter cooling air passes from the left plenum out of a left cover outlet.

10. The dual engine generator of claim 1, wherein a flow of first and second engine cooling air enters the front and back plenums, flows up into a top plenum, between the top cover and the top wall, through apertures in the top cover and down over said engines.

11. The dual engine generator of claim 1, wherein the first engine is separated from the first alternator and first inverter within the inner enclosure by the flow of first alternator cooling air and the flow of first inverter cooling air, respectively and wherein the second engine is separated from the second alternator and second inverter within the inner enclosure by the flow of second alternator cooling air and the flow of second inverter cooling air.

12. A dual engine generator comprising:
a) an inner enclosure comprising:
 i) a front wall;
 ii) a back wall;
 iii) left side wall;
 iv) a right side wall;
 v) a too wall; and
 vi) a base
b) an outer enclosure comprising:
 i) a front cover;
 ii) a back cover;
 iii) left side cover;
 iv) a right side cover; and
 v) a too cover;
c) a plenum between the outer enclosure and the inner enclosure comprising:
 i) a left plenum,
 ii) a right plenum;
 iii) a front plenum; and
 iv) a back plenum;
d) first engine;
e) a first inverter;
wherein a flow of first inverter cooling air enters the inner enclosure through a first inverter inlet to cool the first inverter;
f) a first alternator;
wherein the first engine is coupled with the first alternator to produce a first electrical power; and
wherein a flow of first alternator cooling air enters the inner enclosure through a first alternator inlet to cool the first alternator;
g) a second engine;
h) a second inverter;
wherein a flow of second inverter cooling air enters the inner enclosure through a second inverter inlet to cool the second inverter;
i) a second alternator
wherein the second engine is coupled with the second alternator to produce a second electrical power; and
wherein a flow of second alternator cooling air enters the inner enclosure through a second alternator inlet to cool the second alternator;
i) a controller;
wherein the first and second electrical powers are combined to produce a dual power for powering a load;
k) a first alternator fan; and
l) a second alternator fan;
wherein the first alternator fan draws said flow of first alternator cooling air to cool the first alternator, and wherein the second alternator fan draws said flow of second alternator cooling air to cool the second alternator,
wherein the flow of first alternator cooling air passes from the first alternator inlet into a first alternator plate plenum, that separates the first alternator from the first engine, and from the first alternator late plenum into an alternator plenum and into the right plenum, and wherein the flow of second alternator cooling air gasses from the second alternator inlet into a second alternator plate plenum, that separates the second alternator from the second engine, and from the second alternator plate plenum into a second alternator plenum and into the left plenum.

13. The dual engine generator of claim 12, wherein the flow of first alternator cooling air passes from the right plenum out of a right cover outlet and wherein the flow of second alternator cooling air passes from the left plenum out of a left cover outlet.

* * * * *